United States Patent Office 3,473,372
Patented Oct. 21, 1969

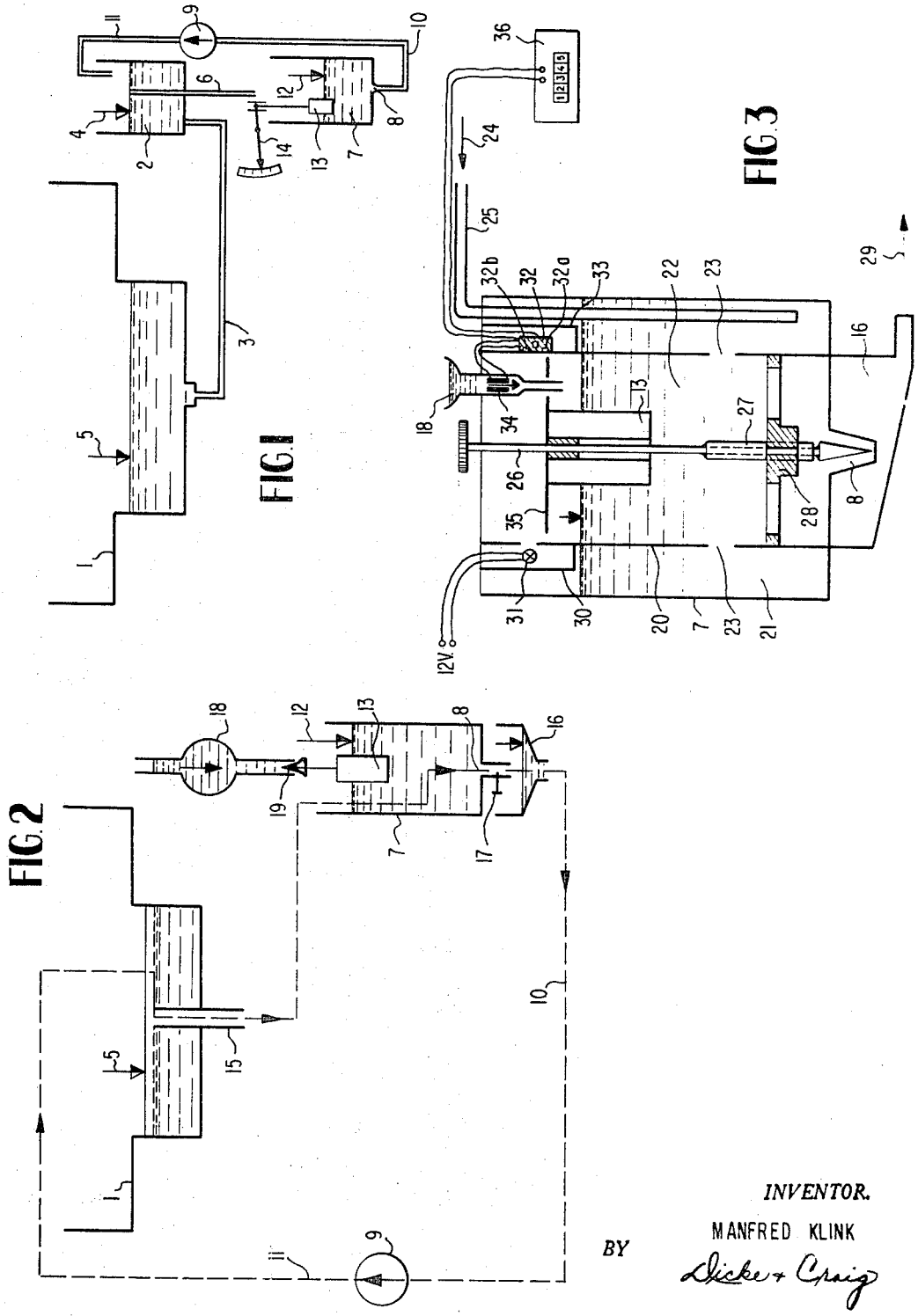

3,473,372
APPARATUS FOR MEASURING ENGINE OIL CONSUMPTION
Manfred Klink, Korb, Kreis Waiblingen, Germany, assignor to Daimler-Benz Aktiengesellschaft, Stuttgart-Unterturkheim, Germany
Filed Nov. 4, 1966, Ser. No. 592,151
Claims priority, application Germany, Nov. 6, 1965, D 48,631
Int. Cl. G01m 13/02
U.S. Cl. 73—118      20 Claims

ABSTRACT OF THE DISCLOSURE

The present invention relates to process and apparatus for measuring the consumption of liquid in a relatively large container that has its liquid level kept constant by delivering container liquid overflow into a relatively small measuring vessel and recycling the liquid from the measuring vessel back into the container. Instead of having the relatively small change in liquid level in the container as a variable to be used in the measurement of the liquid consumption, the present invention employs indicator means for measuring the relatively large change in liquid level produced in the relatively small measuring vessel for determining the consumption of liquid in the container.

Background of the invention

The field of the present invention includes liquid consumption measuring apparatus and process.

In the prior art, various method and apparatus for measuring the oil consumption in internal combustion engines are known that essentially start with weighing the amount of oil in the engine, particularly, the engine oil pan. Generally, this weighing can only be accomplished in a very cumbersome manner, if the engine is operating. Also, errors in measurement are quite likely to occur. Some prior art devices and methods rely upon a direct measurement or observation of the crankcase oil level decrease. This latter process and apparatus has the very serious disadvantage arising from the fact that the amount of consumed oil is very small in comparison to the entire quantity of oil present in the oil pan, particularly if the measurement is not taken over a very long period of time; therefore, the oil consumption generally results in only a very minor decrease in the level of the oil during the measurement time, which is extremely difficult to measure or observe.

For the above reasons, it has been proposed in the prior art to employ highly sensitive measuring procedures and apparatus for determining the proportion of an indicating or marking agent in the engine exhaust gases; the agent having previously mixed with the lubricating oil and not being present in the engine fuel. Such measuring procedures and apparatus usually employ radioactive substances and mass spectrometers; these are too expensive to satisfy the generally desired requirements and to be employed for mass use in all passenger automotive vehicles.

In view of the above noted failures of the prior art, it is an object of the present invention to provide a method and apparatus that is simple and inexpensive for obtaining a highly accurate measurement of the oil consumption in operating engines, with only a short period of time being required for conducting the measurement.

Summary of the invention

The present invention relates to process and apparatus for measuring the consumption of liquid in a relatively large container that has its liquid level kept constant by delivering container liquid overflow into a relatively small measuring vessel and recycling the liquid from the measuring vessel back into the container. Instead of having the relatively small change in liquid level in the container as a variable to be used in the measurement of the liquid consumption, the present invention employs indicator means for measuring the relatively large change in liquid level produced in the relatively small measuring vessel for determining the consumption of liquid in the container. Therefore, with the present invention the normal relatively small liquid level decrease due to consumption in the oil pan can be hydraulically transformed into a relatively large liquid level decrease in the measuring vessel in the ratio of the area of the oil level in the oil pan to the area of the oil level in the measuring vessel, assuming a constant cross-sectional area for the measuring vessel. It is seen that the decrease in the oil level in the measuring vessel yields a measurement value for the oil consumption in the container, that is, the oil pan. With the present invention, almost any desired ratio may be employed, so that the accuracy of the measurement or observation of the decrease in liquid level in the measuring vessel and the resulting accuracy of the oil consumption measurement can be correspondingly and considerably increased.

The apparatus for carrying out the process of the present invention may simply comprise an overflow for maintaining a constant oil level in the oil pans, a measuring vessel, and a pump connected to an outlet opening in the measuring vessel for recycling the amount of oil entering the measuring vessel back into the oil pan. The important factor for the apparatus of the present invention is, as mentioned above, that the cross section of the measuring vessel and thus the surface area of the oil level in the measuring vessel is smaller than the cross section of the oil pan and thus the surface area of the corresponding oil pan oil level.

The overflow of the measuring device may be provided directly in the oil pan, but it can also be arranged in a container communicating with the oil pan so that no alterations have to be made to the engine, because the second container may be connected in a simple manner to the oil pan, for example to the oil drain plug of the oil pan.

The measurement or observation of the level in the measuring vessel may be conducted in various ways. Advantageously, a float may be provided in the measuring vessel so that the positions of the float is a measurement of the oil consumption. The float may be mechanically coupled with an indicating device, for example, a scale pointer; however, it is also contemplated that the vertical position of the float may be maintained constant, that is, the oil level in the measuring vessel may be maintained constant, by means of a control unit for opening and closing the outlet opening of an additional measuring vessel, for example, a measuring pipette, in response to movement of the float or change in oil level in the main measuring vessel. This control unit may be advantageously equipped with photocells or the like for controlling an electromagnetic valve at the outlet opening of the additional measuring vessel.

In the drawings, the illustrations are somewhat schematic to more clearly bring out the novel features of the present invention, because the vessels, conduits, valves, floats, pumps, etc., are conventional per se.

Brief description of the drawing

Further objects, features and advantages of the present invention will appear from the following description of the accompanying drawing, in which:

FIGURE 1 is a schematic illustration of an apparatus employing the features of the present invention with an auxiliary container communicating with the oil in the engine oil pan and a measuring vessel associated with the auxiliary container;

FIGURE 2 is a schematic illustration of another embodiment of the present invention with the measuring vessel in direct communication with the engine oil pan and means for maintaining the oil level in the engine oil pan constant; and FIGURE 3 is a schematic illustration of a further embodiment of the measuring vessel of FIGURE 2.

Description of the preferred embodiments

In FIGURE 1, an engine oil pan 1, preferably an automotive vehicle engine oil pan, is in liquid communication with an auxiliary container 2 by means of the conduit 3, for example, a tube, hose, or the like. With this arrangement, there is obtained an oil level 4 in the auxiliary communicating container 2 that corresponds in height to the oil level 5 in the engine oil pan 1. In the auxiliary container 2, an overflow conduit 6 maintains a constant level in the auxiliary container 2 by collecting and delivering overflow liquid downwardly into a measuring vessel 7. The measuring vessel 7 is provided at its bottom with an outlet opening 8. The outlet 8 is connected to an oil pump 9 by means of the conduit 10. The pump 9 pumps the oil from the measuring vessel 7 through conduit 10 and into the conduit 11 for delivery into the auxiliary container 2 for recycling the oil.

When the pump 9 of the device of FIGURE 1 is actuated, it withdraws liquid from the measuring vessel 7 through the conduit 10 at a predetermined rate and feeds this amount of liquid through the conduit 11 into the auxiliary container 2. Thereby, the oil level 4 will first be somewhat increased, whereby oil flows through the overflow 6 into the measuring vessel 7. After a predetermined relatively short running time, the oil cycle between the vessels 7 and 2 become steady so that a constant oil level 4 is attained and maintained in the auxiliary container 2 and also in the oil pan 1. With this arrangement, the oil level 4 will be constant and substantially equal to the oil level 5, which is extremely important during the measurement. If there is no oil consumption, the oil level 12 in the measuring vessel will also remain constant after the steady state has been reached.

If after a certain period of time, there is oil consumption in the oil pan 1, the oil level 5 and thus also the oil level 4 will tend to decrease by a certain amount, however, this amount is compensated for by the oil recycling between the auxiliary container 2 and the measuring vessel 7 so that the oil level 12 in the measuring vessel 7 will decrease, because as previously mentioned the oil level 4 and the oil level 5 will remain constant with the aid of the oil pump 9. The quantity of oil consumed in the oil pan 1, is thus withdrawn from the measuring vessel 7 in the embodiment according to FIGURE 1; the oil level 12 is lowered during this consumption. It is thus seen that the lowering of the oil level 12 is proportional to or at least corresponds to the consumption of oil in the oil pan 1.

The measurement of the oil consumption in the oil pan 1 is accomplished by measuring the lowering of the oil level 12 in the measuring vessel 7. A float 13 is provided in the measuring vessel 7 for actuating an indicator 14. The float 13 is provided with an upwardly extending arm that is pivotally mounted to one end, the right hand as shown in FIG. 1, of a pivotally mounted indicator pointer 14. The indicator 14 cooperates with a scale on the other end, which scale may be marked to directly indicate oil consumption. Also, it is contemplated that the float 13 may operate an electrical gate, instead of the mechanical monitoring device 14 so that an electrical signal indicating oil consumption is obtained, which may be used to operate a gauge, for example. As a relatively narrow aspect of the present invention, an essential factor is that the cross-section of the measuring vessel 7, that is, the surface area of the oil level 12, is very much smaller than the surface of the oil level 5 in the oil pan 1 and oil level 4 in the auxiliary container 2. Thereby, the lowering of the level 12 is increased in proportion to the increase of the ratio of the surface areas of the oil level in the oil pan and auxiliary container relative to the surface area of the oil level in the measuring vessel 7, assuming for example, constant cross-sectional areas for decreased oil levels. Thus, a hydraulic transformation and amplification of the lowering of the oil level 5 in the oil level pan 1 is produced by the present invention. In this manner, the accuracy of the measurement of the oil consumption is considerably increased.

The apparatus 2–4 and 6–13 may be manufactured as a separate item and sold separately from the automobile. Also, this apparatus may be supplied as auxiliary equipment for existing older automobiles. The apparatus may be suitably mounted on the automobile and the scale associated with the indicator pointer 14 may be mounted on the automobile instrument panel. Also, it is contemplated that the conduit 3 may be connected to the conventional drain opening of existing automobiles by means of a threaded enlargement on the corresponding end of the conduit 3.

In the embodiment of FIG. 2, like numerals have been used to refer to elements that correspond to similar elements in FIG. 1 for purposes of simplicity and clarity.

In the device of FIG. 2, the oil pan 1 is provided directly with an overflow tube or device 15 that will maintain the liquid level 5 in the oil pan 1 constant by conducting liquid overflow into the measuring vessel 7 as indicated by the arrowed dotted line running through the overflow tube 15 and into the measuring vessel 7; it is understood that this dotted line represents the recycling flow of the oil that is conducted through suitable conduits (not shown) that may be connected between the elements. After entering the measuring vessel 7, the oil flows through the outlet 8 of the measuring vessel 7 and into a funnel-like container 16 for recycling through conduits 10 and 11 (not shown in detail) by means of the pump 9. Also, it is contemplated that the funnel 16 may be omitted and that the conduit 10 may be directly connected to the outlet opening 8 in an identical manner to the connection shown in FIG. 1 between the conduit 10 and the measuring vessel 7. The throttling screw 17 is suitably adjusted to match the withdrawal of fluid from the container 16 by the pump 9. Once the oil cycle has assumed its steady state condition, there will also be a constant oil level in the funnel 16 to provide a constant back pressure on the pump 9 regardless of oil consumption.

For measuring the change in liquid level 12, the float 13 is provided in the measuring vessel 7 and coupled with a measuring glass or column 18. The outlet opening 19 of the measuring column 18 is provided with a valve that is opened and closed by lowering and raising of the float 13. When the valve at the opening 19 is opened, oil enters into the measuring vessel 7 from the measuring column 18 until the steady state condition oil level of the measuring vessel 7 is restored and the float 13 raises to close the valve in the opening 19. The connection between the float 13 and the valve may be a direct mechanical connection as shown, or it may be an electrical signal connection to an electromagnetic valve or a mechanical advantage connection such as that produced by a pivoting lever linkage. With the embodiment of FIG. 2, the oil level 5 in the oil pan 1 and the oil level 12 in the measuring vessel 7 are kept constant. The amount of oil required for keeping the oil level 12 constant is taken from the measuring column 18 in accordance with the particularly advantageous construction of the present invention. With the aid of this device, the oil consumption may be accurately determined by a change of oil level in the measuring column 18 in a relatively short measuring time.

In a manner similar to that set forth above in regard to the device of FIG. 1, the measuring apparatus 7–13 and 15–18 may be provided as an accessory for existing automobiles or as original equipment. The measuring column 18 may be provided with a conventional liquid level measuring indicator to directly indicate the oil consumption for mounting on the instrument panel, the vessels 7 and 16 may be suitably mounted to the automobile and the overflow tube 15 may be inserted into and attached to the conventional oil drain outlet of the oil pan 1. Also, it is contemplated that any part of, or all of, the measuring component 7, 8, 12, 13, 16, 17, 18 and 19 of FIG. 2 may be substituted for the corresponding measuring component 7, 8, 12, 13, and 14 of FIG. 1.

In the embodiment according to FIGURE 3, a suitable measuring component has been illustrated that may be used in place of either the measuring component 7, 8, 12, 13, and 16–19 of FIG. 2 or alternatively the measuring component 7, 8, 12 and 14 of FIG. 1.

In the embodiment according to FIG. 3, a cylindrical shell or annular wall 20 is suitably mounted in a sealing manner in the measuring vessel 7 so that the wall 20 divides the measuring vessel 7 into an annular chamber 21 and a cylindrical interior chamber space 22. The two chambers 21 and 22 are in communication with each other only through throttle openings 23. The oil enters the measuring vessel 7 in the direction of the arrow 24 through the conduit 25 from the overflow 15 (FIG. 2) of the oil pan 1. Because of the oil pan overflow, there are certain variations in the amount of oil entering through the conduit 25; the subdivision of the measuring vessel 7 into two chambers that are only connected by throttle openings 23 produces a dampening effect or steadying of the oil level in the space 22.

The float 13 is guided on a spindle 26 so that it can be freely moved upwardly and downwardly in response to changing oil levels in the chamber 22. The spindle 26 is guided in a support 28 by means of a threaded connection 27. The support 28 is mounted on the wall 20. The upper portion of the spindle 26 is provided with a knob for turning the spindle to raise and lower the conical lower portion of the spindle by means of the threaded connection 27 to vary the cross sectional area of the exit opening 8 of the measuring vessel 7, so that it is possible to regulate the amount of oil entering the funnel 16 and further conveyed with the aid of the pump 9 in the direction of the arrow 29.

In the upper portion of the measuring vessel 7, a housing 30 is mounted to the wall 20 and provided with a light source 31. A plurality of photocells 32 are provided preferably diametrically opposed to the light source 31, in a housing 33. In the condition illustrated in FIG. 3, the photocell 32a positioned at the bottom has light impingeing on it from the light source 31. The photocells 32 are constructed in such a manner and connected by means of electrically conductive wires with the electromagnetically actuated valve 34 that controls the outlet opening for the measuring glass or column 18 in such a manner that, in this position of the float 13, the valve 34 opens and oil flows from the measuring column 18 into the chamber 22. During the filling of the chamber 22 by means of oil from the measuring column 18, the float 13 rises until its upper disc diaphragm 35 reaches the height of the upper photocell 32b. At this point, the upper photocell 32b closes the elctromagnetic valve 34 so that no further liquid can escape from the measuring column 18. After a considerable length of time and further oil consumption, the float 13 with its disc 35 may again be lowered below the lower photocell 32a and the above described procedure repeats itself. At any time during the operation of the engine or when it is shut down, the amount of consumed oil may be directly read off from the measuring column, which may be provided with a suitable scale, or from a counter 36 that is connected with the photocells and counts the pulses triggered by the photocells. The counter would give an indication of the consumed oil because the electromagnetic valve 34 will release a predetermined amount of oil from the measuring column 18 for each of its complete operations. Also, it is contemplated that the photocells 32a and 32b may be actuated directly by the liquid level instead of by the diaphragm 35 of the float 13, so that the float 13 may be dispensed with, although the float 13 has considerable advantages.

Thus, by means of the above described apparatus and process according to the embodiments of FIGS. 1–3, it is possible to determine while the engine is running the amount of consumed oil accurately in a very short period of time. In place of the photocell monitoring device of the oil level in the measuring vessel it is also contemplated that the float may be coupled with an electrical gate that may be suitably connected with a conventional electrically actuated indicating device. Likewise, an electronic monitoring unit may be employed within the broad teachings of the present invention.

The above embodiments have been shown and described only as examples of the broader aspects of the present invention, and other modifications and embodiments are contemplated within the spirit and scope of the present invention as defined by the following claims.

I claim:

1. Apparatus for measuring the liquid level in a container, comprising: overflow means for removing liquid above a fixed liquid level in the container; a measuring vessel having a liquid level cross-section substantially smaller than said container and a liquid outlet; said overflow means delivering by gravity the container liquid overflow into said measuring vessel; single pump means connected to said outlet for recycling oil from said measuring vessel into the container; means for directly measuring the liquid level in said measuring vessel.

2. The apparatus of claim 1, wherein said overflow means is provided with means for connecting it with the engine oil pan of an automotive vehicle.

3. The apparatus of claim 2, wherein said overflow means is provided within said oil pan.

4. The apparatus according to claim 1, including an auxiliary container in direct free liquid communication with the first mentioned container; said overflow means being provided in said auxiliary container.

5. The apparatus according to claim 4, said measuring means having a float control in said measuring vessel for indicating the liquid consumption.

6. The apparatus of claim 5, said measuring means including a mechanical indicator being mechanically coupled to said float.

7. The apparatus of claim 5, said measuring means including a measuring column having an outlet end, monitoring means driven by said float for selectively opening and closing said column outlet for replenishing the amount of liquid corresponding to the lowering of the liquid level in said measuring vessel.

8. The apparatus of claim 7, said measuring vessel having an annular internal wall subdividing it into inner and outer chambers; said wall having throttle liquid passage means for providing the only liquid communication between said chambers.

9. The apparatus of claim 8, said overflow means delivering the container liquid overflow into said outer chamber and said pump means recycling the liquid from said inner chamber.

10. The apparatus of claim 9, said float being provided in said inner chamber.

11. The apparatus of claim 2, including an auxiliary container in direct free liquid communication with the first mentioned container; said overflow means being provided in said auxiliary container.

12. The apparatus of claim 2, said measuring means having a float control in said measuring vessel for indicating the liquid consumption.

13. The apparatus of claim 12, said measuring means including a mechanical indicator being mechanically coupled to said float.

14. The apparatus of claim 12, said measuring means including a measuring column having an outlet end, monitoring means driven by said float for selectively opening and closing said column outlet for replenishing the amount of liquid corresponding to the lowering of the liquid level in said measuring vessel.

15. The apparatus of claim 12, said measuring means including a liquid measuring column having an outlet and valve at its outlet, a plurality of vertically arranged photocells and electromagnetic actuator means responsive to signals produced by said photocells for controlling the operation of said column valve.

16. The apparatus of claim 15, including spindle means freely mounting said float for uninhibited vertical movement; said float having opaque means for actuating said photocells during vertical movement of said float to indicate the vertical position of said float and the corresponding liquid level in said measuring vessel.

17. The apparatus of claim 15, said actuator means operating said valve to release a predetermined quantity of liquid from said measuring column with each operation; means for counting the total number of operations of said actuator means for indicating the liquid consumption.

18. The apparatus of claim 2, said measuring vessel having an annular internal wall subdividing it into inner and outer chambers; said wall having throttle liquid passage means for providing the only liquid communication between said chambers.

19. The apparatus of claim 18, said overflow means delivering the container liquid overflow into said outer chamber and said pump means recycling the liquid from said inner chamber.

20. The apparatus of claim 19, wherein said float is provided in said inner chamber.

References Cited
UNITED STATES PATENTS

| | | | |
|---|---|---|---|
| 616,594 | 12/1898 | Alstyne | 73—427 X |
| 1,491,999 | 4/1924 | Petersson | 73—223 |
| 2,316,000 | 4/1943 | James | 222—67 X |
| 2,669,869 | 2/1954 | Weber | 73—113 |
| 3,000,207 | 9/1961 | Goffe | 73—223 X |

RICHARD C. QUEISSER, Primary Examiner

JERRY W. MYRACLE, Assistant Examiner

U.S. Cl. X.R.

137—386; 184—103

Dedication 3,473,372.—*Manfred Klink*, Korb, Kreis Waiblingen, Germany. APPARATUS FOR MEASURING ENGINE OIL CONSUMPTION. Patent dated Oct. 21, 1969. Dedication filed Mar. 22, 1976, by the assignee, *Daimler-Benz Aktiengesellschaft*.

Hereby dedicates to the Public the remaining term of said patent.

[*Official Gazette May 4, 1976.*]